United States Patent
Tornetta et al.

(10) Patent No.: US 6,188,702 B1
(45) Date of Patent: Feb. 13, 2001

(54) HIGH SPEED LINKING MODULE

(75) Inventors: Anthony G. Tornetta, King of Prussia, PA (US); Harry V. Paul, Haddonfield, NJ (US)

(73) Assignee: Inrange Technologies Corporation, Mount Laurel, NJ (US)

( * ) Notice: Under 35 U.S.C. 154(b), the term of this patent shall be extended for 0 days.

(21) Appl. No.: 09/428,753

(22) Filed: Oct. 28, 1999

Related U.S. Application Data

(60) Provisional application No. 60/108,866, filed on Nov. 17, 1998.

(51) Int. Cl.[7] ............................... H04J 3/14; H03M 9/00
(52) U.S. Cl. ......................... 370/535; 370/539; 341/101; 709/115
(58) Field of Search ..................................... 370/225, 535, 370/537, 538, 539, 540, 541, 506; 341/100, 101; 709/115, 104

(56) References Cited

U.S. PATENT DOCUMENTS

| | | | |
|---|---|---|---|
| 3,872,257 | * 3/1975 | Bleickardt et al. | 370/506 |
| 4,646,286 | * 2/1987 | Reid et al. | 370/225 |
| 5,001,711 | * 3/1991 | Obana et al. | 370/535 |
| 5,414,851 | * 5/1995 | Brice, Jr. et al. | 709/104 |
| 5,757,297 | * 5/1998 | Ferraiolo et al. | 341/100 |

OTHER PUBLICATIONS

Enterprise Systems Architecture/390—ESCON I/O Interface, Chapter 1, General Concepts SA22–7202–02 21 pages (1992).

* cited by examiner

*Primary Examiner*—Alpus H. Hsu
*Assistant Examiner*—Afsar M. Qureshi
(74) *Attorney, Agent, or Firm*—Hamilton, Brook, Smith & Reynolds, PC

(57) ABSTRACT

A device for converting at least four parallel data streams on respective input data lines into one serial data stream on a fiber optic data line. The device includes a first multiplexer for multiplexing at least two of the parallel data streams into a first intermediate output stream and a second multiplexer for multiplexing at least two other of the parallel data streams into a second intermediate output stream. A serializing transmitter is coupled to the first and second multiplexers for serializing the first and second intermediate output streams into the serial data stream. A signal synchronizes the serializing of the first and second intermediate output streams and tags output data in the serial data stream as corresponding to data from each of the respective input data lines. In-band messaging is used to transfer commands and status messages between devices without affecting ongoing data stream communications.

13 Claims, 11 Drawing Sheets

HIGH SPEED LINKING MODULE

This application claims the benefit of Provisional No. 60/108,866 filed Nov. 17, 1998.

TECHNICAL FIELD

The present invention relates, in general, to an apparatus and method for linking data processors and peripheral devices and, more specifically, to an apparatus and method for linking devices over high speed fiber optic links.

BACKGROUND OF THE INVENTION

Data centers are typically linked together so that data may be shared by multiple customers, who are remotely located from each other. The customers, such as banks and credit card issuers, need high speed connectivity between their server systems and mainframe systems to provide quality service and maximize their investment in information management. Applications that require such high speed connectivity include transaction co-processing, massive file transfers for decision support, archival databases for disaster recovery and transaction reporting requirements.

Referring to FIG. 1, there is provided a data processing interconnection system 10 of the prior art. An example of system 10 is an IBM data processing interconnection system known as Enterprise Systems Connection ("ESCON") (Trade Mark). "ESCON" is an interconnection system using fiber optic technology. Fiber optic links, such as links 14, 18, 22 and 26 create a local area network extending for kilometers among numerous systems, such as host processor 12, control units 24 and 28.

In "ESCON" architecture multiple systems may communicate with each other via channel-to-channel communications. For example, multiple mainframe systems may communicate channel-to-channel or gain access to multiple devices or communication control units. Referring to FIG. 1, channel directors 16 and 20 are capable of employing any-to-any, point-to-point switching and may make numerous physical connections between each other and peripheral devices. As shown, channel director 20 connects four fiber optic links 18 from channel director 16 with two fiber optic links 22 and two fiber optic links 26, each respectively branching to control units 24 and 28.

Although not shown in FIG. 1, channel director 20 or 22 may have as many as 256 optical ports to support as many as 128 "ESCON" connections simultaneously and without contention. Each channel director includes a set of quad port adapters (QPAs). Each QPA handles the "ESCON" input or output data with four individual ports. The ports include either multi-mode optical transceivers or single-mode optical transceivers. Two QPA modules are shown in FIG. 1, namely QPA module 17 and QPA module 19.

A more detailed arrangement of QPAs is shown in FIG. 2. As illustrated, multiple QPAs 17a–17n are coupled to switch matrix 15 within channel director 16. Each QPA has four output/input ports (27a–27n) for providing up to four connections to remote devices. Switch matrix 15 provides the switching fabric to connect any one ESCON port to any other ESCON port. For example, two ports (27a) in QPA (1) are connected to two ports (27b) in QPA (2). In this manner, channel director 16 provides multiple interfaces and channel-to-channel switching among multiple devices.

A physical link between two points may consist of two fibers, one for transmitting and one for receiving. Information on the link is transmitted in a special 10-bit code, giving an instantaneous link rate of 20 megabytes per second or 200 megabits per second. After deducting for control (e.g., pacing bytes) and data encoding overhead, a channel data rate for real application data of 17 megabytes per second is achieved.

Data are transmitted in the form of packets of characters called frames. Each character contains 10 bits when use is made of the 8 of 10 code to provide a dc balanced code. The frames can vary in size from 12 bytes to 1036 bytes. Each frame includes both the frame source address and its destination address. The addresses are used to route frames through the network. A switch matrix controller (not shown) within the channel director examines the destination address and dynamically connects the port receiving the frame to the destination port.

"ESCON" technology permits a maximum link rate of 200 megabits/sec between channel directors. The physical links are one-to-one and one port is required at each channel director to support both sides of the link. This one-to-one arrangement can become expensive, because valuable ports and fiber are consumed to support communications between channel directors. Typically, a user must lease one fiber optic link for every port in a control unit. More detail of "ESCON" architecture is provided by S. A. Calta, et al. in "Enterprise Systems Connection (ESCON) Architecture-System Overview", July 1992, (IBM Journal Res. Development, Vol. 36, No. 4) and is incorporated herein by reference.

A need still exists for an apparatus and method for communicating between channel directors that does not require a one-to-one physical link per port. A need also exists for an interface device that may simultaneously support connectivity from multiple "ESCON" ports onto a single fiber link to reduce the cost of leasing fiber links.

SUMMARY OF THE INVENTION

To meet this and other needs, and in view of its purposes, the present invention provides an apparatus and a method for communicating between two devices over a single link, wherein each device has a plurality of ports. The method includes:

(a) converting a plurality of data streams from respective ports of a first of the two devices into one serial data stream, including the steps of:
  (i) multiplexing at least two of the plurality of data streams into a first intermediate output stream;
  (ii) multiplexing at least two other of the plurality of data streams into a second intermediate output stream;
  (iii) serializing the first and second intermediate output streams into the serial data stream,
  (iv) synchronizing the serialization of the first and second intermediate output streams,
  (v) tagging output data in the serial data stream as corresponding to data from each of the respective ports of the first device, and
  (vi) transmitting the serial data stream on the single link to a second of the two devices;
(b) converting the serial data stream in the second device to at least four input data streams, and
(c) sending each of the input data streams to a port of the second device.

Step (b) includes the steps of:
  (i) de-serializing the serial data stream into first and second intermediate parallel data streams,
  (ii) demultiplexing the first intermediate parallel data stream into two parallel data streams on two respective data lines;

(iii) demultiplexing the second intermediate parallel data stream into two other parallel data streams on two other respective data lines;

(iv) synchronizing the de-serialization of the first and second intermediate output streams and (v) separating data in the serial data stream to data for each of the respective data lines.

In one embodiment, the single link is a fiber optic link. Also included is a signal having a cycle with a first phase and a second phase, and tagging two of the respective ports with the first phase and tagging two other respective ports with the second phase.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
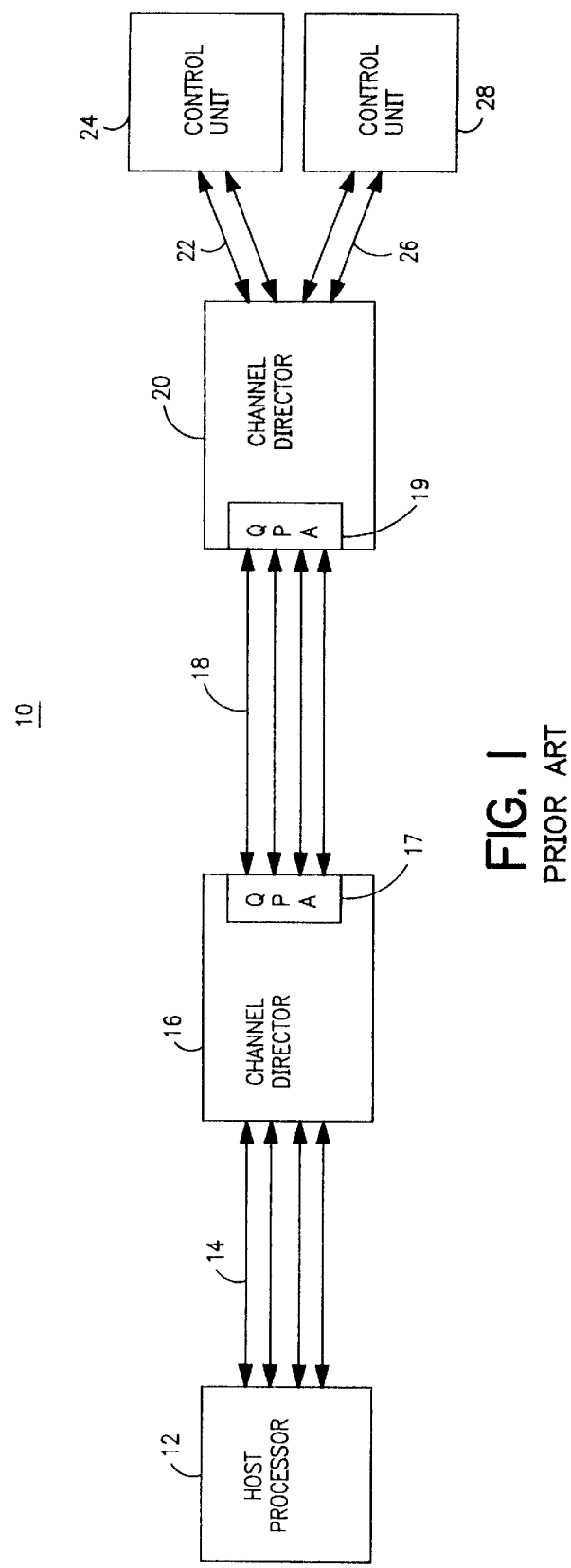
FIG. 1 is a block diagram of a conventional channel-to-channel communications system.
Figure 3:
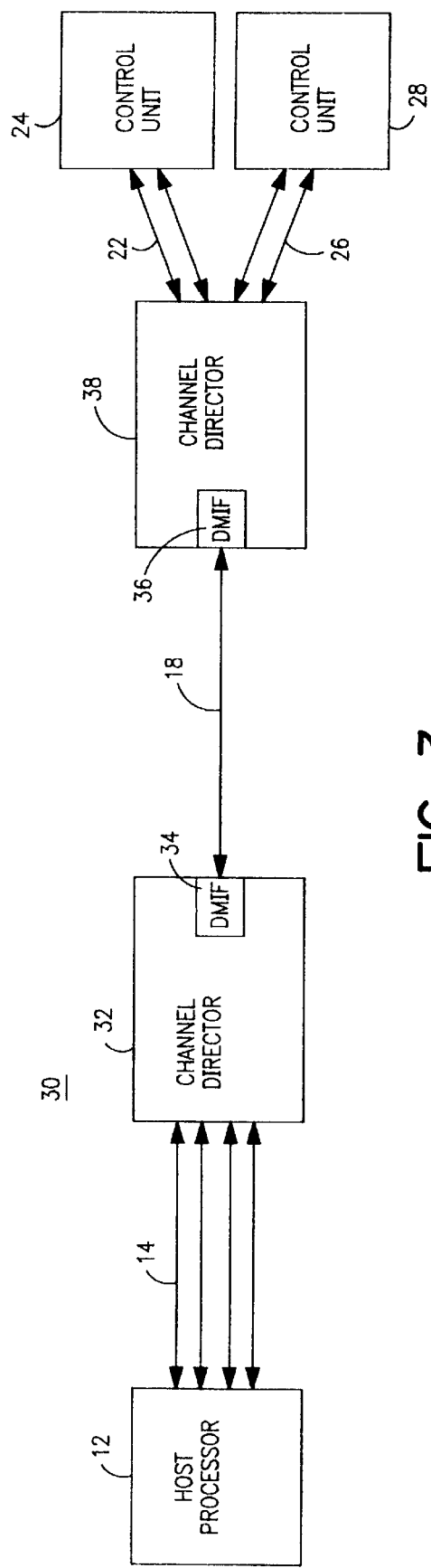
FIG. 3 is a block diagram of a channel-to-channel communications system using an embodiment of the present invention.

Referring to FIG. 3, an embodiment of the invention will now be described. Data processing interconnection system 30 includes host processor 12; links 14, 18, 22 and 26; and control units 24 and 28. These elements are similar to elements shown in FIG. 1. Also included are channel directors 32 and 38, respectively containing modules 34 and 36. The modules are each labeled Director Multiple Interface Facility (DMIF). In the embodiment shown in FIG. 3, DMIF 34 and DMIF 36 are connected by a single fiber optic link 18, thereby providing an advantage over the prior art system 10 which requires four fiber optic links 18 (FIG. 1).

As will be explained in detail, the DMIF module replaces, for example, a QPA module within each channel director, and acts and behaves like a QPA module to the rest of the system. The DMIF module, however, is different in that it includes one port instead of four ports. The DMIF module may multiplex four "ESCON" ports, each passing data at a rate of 200 megabits/sec, into one high speed port passing data at a rate of 960 megabits/sec. The DMIF module may also demultiplex the 960 megabits/sec into four individual data streams running at 200 megabits/sec. The DMIF module advantageously allows a user to transmit/receive data on four "ESCON" links with only one fiber link. This saves the user the expense of leasing three extra fiber cables.

Although only one fiber optic link 18 is shown in FIG. 3, it will be appreciated that there may be multiple fiber optic links between channel director 32 and channel director 38. There may also be multiple fiber optic links from one channel director to several channel directors (not shown). Thus, the savings to the user multiply for each DMIF module that replaces a QPA module. The savings multiply up to a maximum of ½ of the total number of QPA modules that may be inserted in a channel director. For example, in a channel director that contains 64 QPA modules (256 ports), a maximum of 32 DMIF modules may be inserted to provide a mix of 32 DMIF modules and 32 QPA modules. This maximum is due to the need for four individual ports to be contained within the channel director for each DMIF module.

Figure 2:
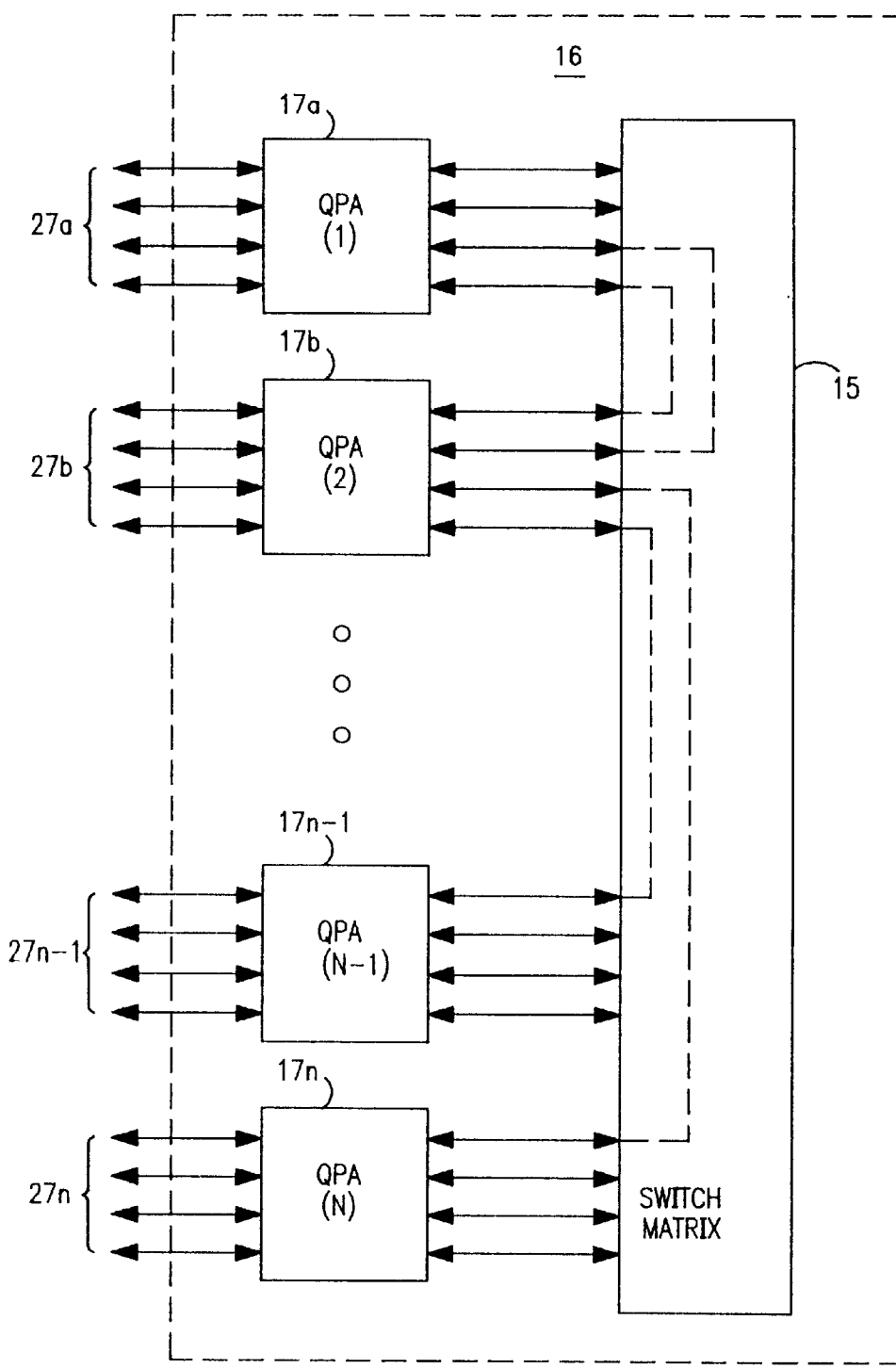
FIG. 2 illustrates a conventional switch matrix for connecting optical links among devices in the communications system of FIG. 1 by using QPAs, each having four I/O ports.
Figure 4:
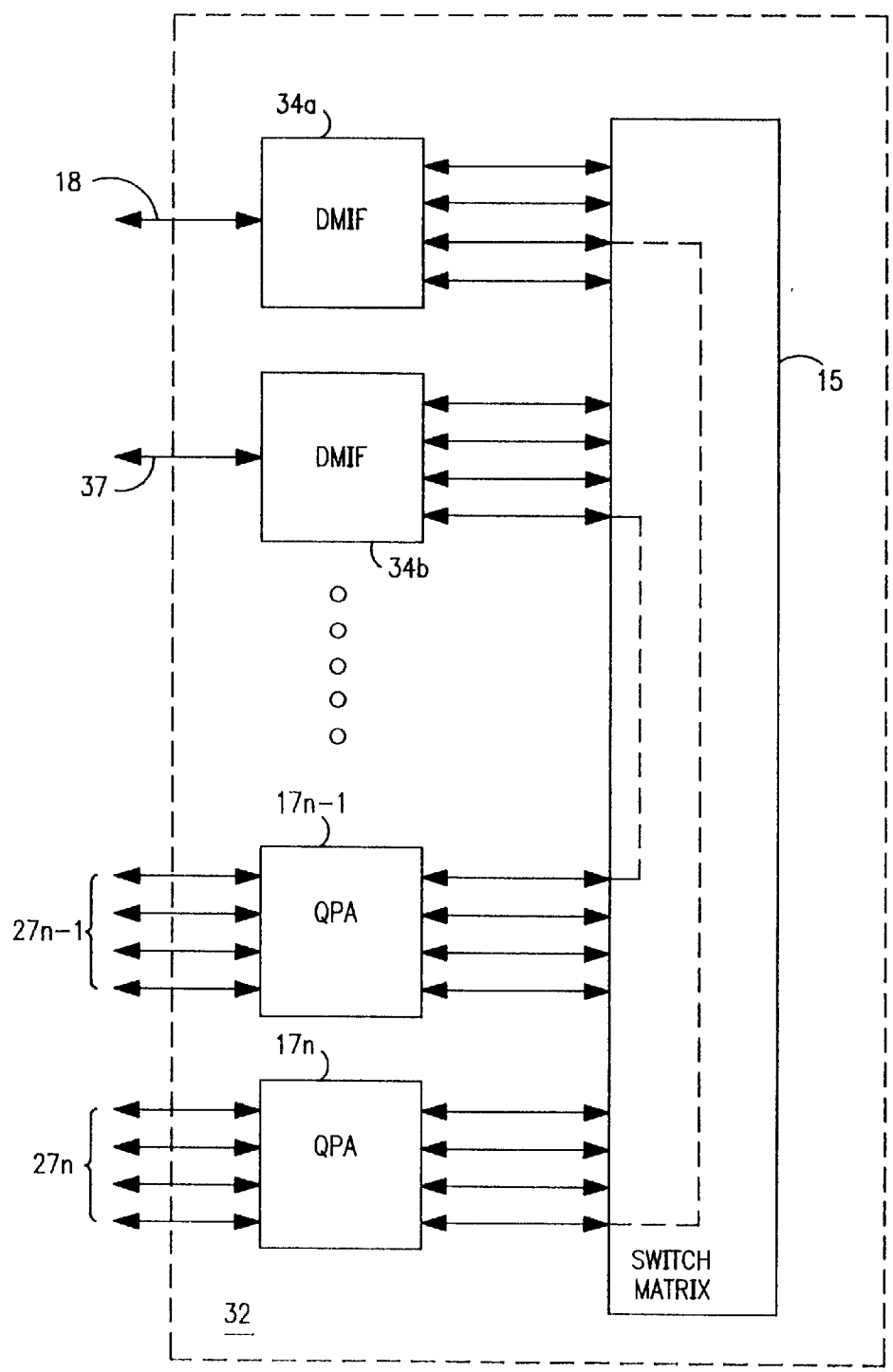
FIG. 4 illustrates several director multiple interface facility (DMIF) modules of the present invention having replaced the QPA modules of FIG. 2.

The mix of modules is shown in FIG. 4. As shown, channel director 32 contains multiple DMIF modules 34*a* and 34*b* and multiple QPA modules 17*n*–1 and 17*n*. Thus, QPA (1) and QPA (2) in FIG. 2 have been replaced with DMIF modules 34*a* and 34*b*. Since the DMIF modules each require one output port connected, for example, as shown to optic links 18 and 37, the complexity and expense of six ports is eliminated from the system shown in FIG. 2.

Figure 5:
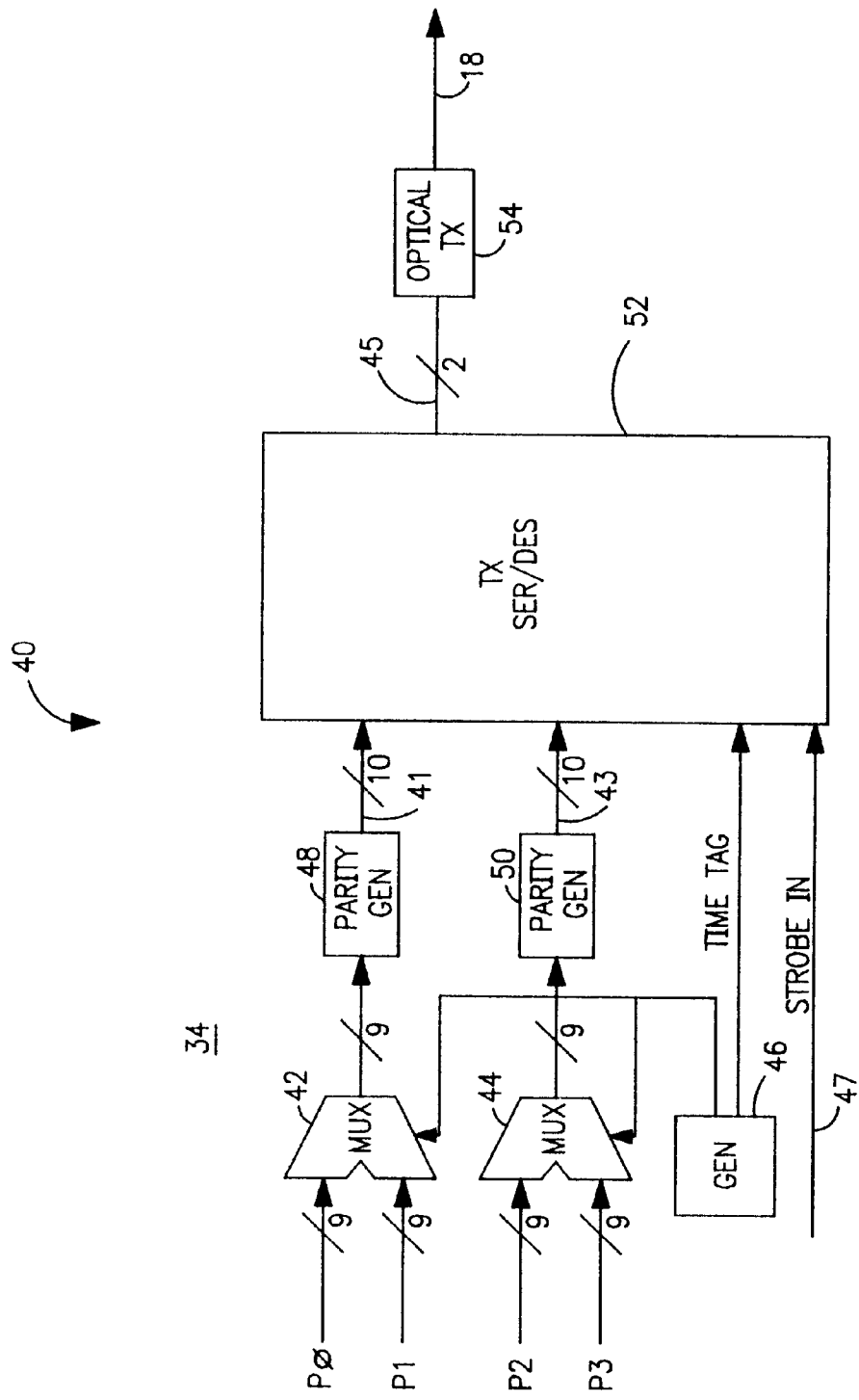
FIG. 5 is a block diagram of a multiplexer of the present invention incorporated in the DMIF module of FIG. 4.
Figure 6:
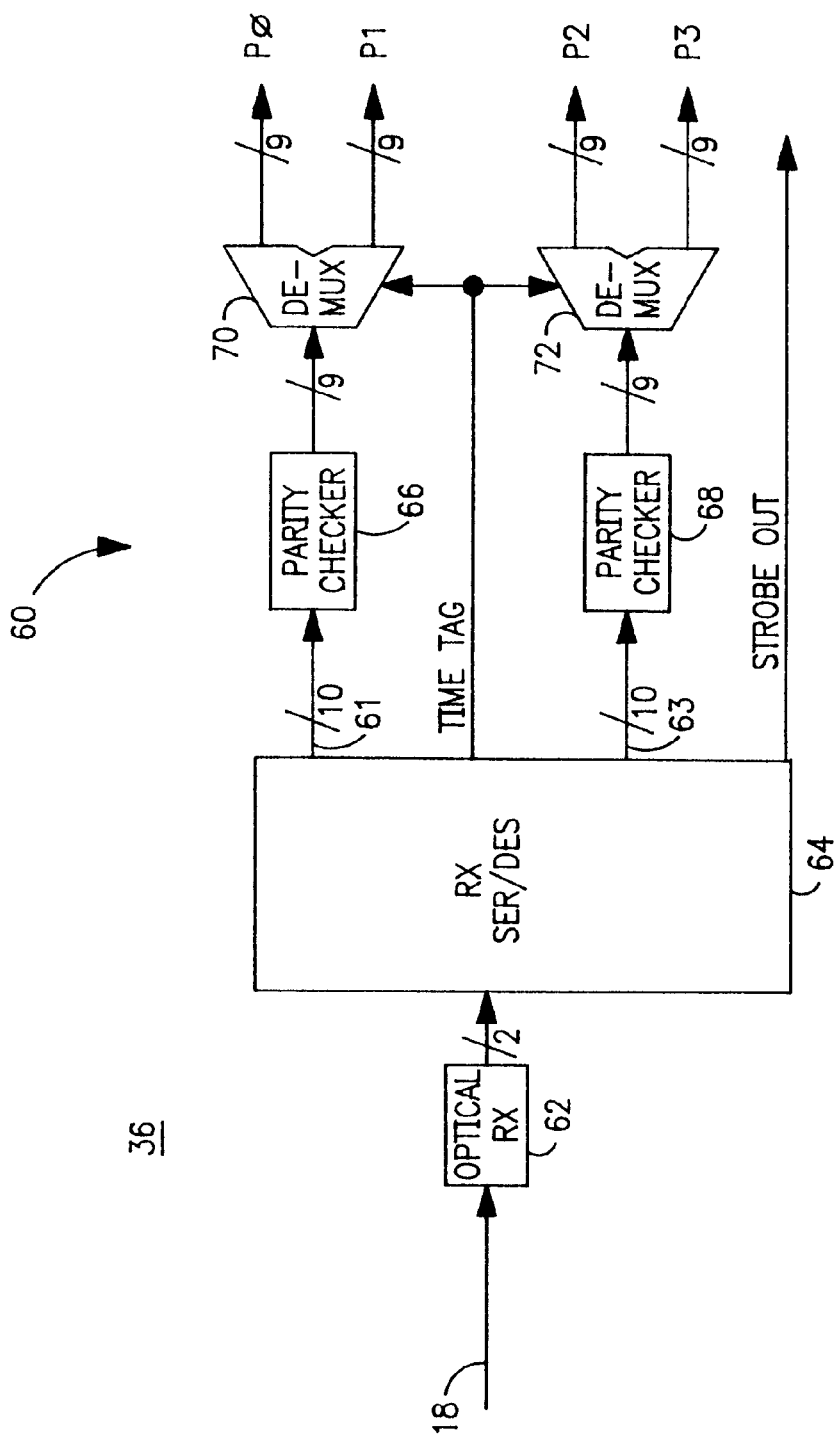
FIG. 6 is a block diagram of a demultiplexer of the present invention incorporated in the DMIF module of FIG. 4.

One embodiment of the DMIF module will now be explained by reference to FIGS. 5 and 6. FIG. 5 illustrates 4 to 1 multiplexing of data by multiplexer module 40 and FIG. 6 illustrates the inverse, namely 1 to 4 demultiplexing of data by demultiplexer module 60. It will be appreciated that each DMIF module may include both multiplexer module 40 and demultiplexer module 60. In this manner, two-way optical data may be transmitted and received on a single optic link 18. Optic link 18 may be, for example, a single mode (SM) fiber (⁸⁄₁₂₅ microns cable) transmitting at 1300 nm wavelength at a rate up to 960 megabits per second over distances from 2 km to 10 km. A single mode (XDF), dual SC-type connector may be used. Furthermore, in the preferred embodiment there is one laser type fiber optic transceiver per module (shown separately as optical transmitter 54 in FIG. 5 and as optical receiver 62 in FIG. 6).

FIG. 5 illustrates 4 to 1 multiplexing of data, for example, from four "ESCON" ports by multiplexer module 40. "ESCON" port P0, P1, P2 or P3 provides 9 bit data bytes at 20 megabytes/sec rate. Multiplexer 42 multiplexes the data from "ESCON" ports P0 and P1 onto one data path for input to parity generator 48. Parity generator 48 adds parity to make a 10 bit word. Identical processing is performed on the data from "ESCON" ports P2 and P3 by way of multiplexer 44 and parity generator 50. Two 10 bit data streams are presented to serializer/deserializer (ser/des) transmitter 52 at 40 megabytes/sec rate. The result of multiplexing is that data from the four "ESCON" ports are sent as two data frames to ser/des transmitter 52. Time tag generator 46 provides a time tag which is toggled to identify which "ESCON" port's data resides on the 10 bit stream. This time tag is provided as an input to transmitter 52. For example, the time tag may be transmitted as a "0", when the data frame contains data from ports P0 and P2; the time tag may be transmitted as a "1", when the data frame contains data from ports P1 and P3. The state of the time tag is encoded into a control field, as will be explained later, and transmitted, as part of the data stream, onto optical link 18 to be received by another DMIF module, for example DMIF module 36. The time tag is then used by a demultiplexer, at the other end of the link, to demultiplex the data.

Ser/des transmitter 52 performs two to one multiplexing of data. As shown in FIG. 5, transmitter 52 accepts a data frame consisting of 20 bits (10 bits on parallel bus 41 and 10 bits on parallel bus 43) which contain data from two "ESCON" ports (P0 and P2 or P1 and P3). Transmitter 52 also performs a parallel to serial conversion of the data and outputs the data onto serial bus 45. The data are then transmitted onto link 18 by optical transmitter 54.

It will be appreciated that transmitter 52 may be, for example, part of a transceiver chip set from Hewlett Packard, the HDMP-1022 transmitter and the HDMP-1024 receiver. This chip set is also referred to herein as the GLINK chip set. As known to those familiar with the chip set, encoding, multiplexing, clock extraction, demultiplexing and decoding are handled by the chip set. The chip set operates within a frequency range of 150 megabits/sec to 1.5 gigabits/sec. Using "ESCON" data rate of 200 megabits/sec, for example, the chip set operates at 960 megabits/sec, which includes four control bits inserted within the data. The control bits delineate whether the frame is a data, control, or fill frame. These frames will be described later.

As shown, a strobe-in clock is provided on line 47 to transmitter 52. Transmitter 52 uses the strobe-in clock to latch the parallel input data and, by multiplying the clock by 24, produces a serial clock to output the serial data at the higher rate.

It will also be appreciated that transmitter 52 may maintain a DC balance of the data on the link by determining the cumulative sign of the data and control bits of the frame. Based on the sign of the previous and present frames, transmitter 52 may invert the present frame to keep the cumulative sign of all of the frames equal to 0. By maintaining the DC balance of the serial data, there are no restrictions on the type of data that may be sent.

In another embodiment, FIG. 6 shows demultiplexer module 60 of DMIF module 36. As shown, optical receiver 62 receives data from link 18 and provides the data serially to serializer/deserializer receiver 64. Receiver 64 indirectly demultiplexes the data by performing a serial to parallel conversion. The parallel data on busses 61 and 63 together contain a 20 bit wide word that is output at 40 MHz, a rate twice the normal ESCON parallel rate. A time tag is provided from receiver 64 to further demultiplex the data into four ESCON paths. It will be understood that receiver 64, for example, may be part of a transceiver chip set from Hewlett Packard, the HDMP-1024, described above.

Receiver 64 may provide the first half of the 20 bit wide word to parity checker 66 and the second half of the 20 bit wide word to parity checker 68. Each parity checker verifies the parity and provides the remaining 9 bit wide word to demultiplexer 70 and demultiplexer 72, respectively. The time tag, shown in FIG. 6, may be used to demultiplex the data into four outputs, P0, P1, P2 and P3. When the time tag is 0, for example, the data frame may contain data for ports P0 and P2; when the time tag is 1, for example, the data frame may contain data for ports P1 and P3.

It will be appreciated that receiver 64 performs the inverse function performed by transmitter 52 (FIG. 5). Receiver 64 determines the frequency of the link and generates a recovered serial clock during initialization by locking onto the transition in the fill frames (described later). The receiver obtains the 24 bit serial frame and locks the recovered serial clock to the data. The receiver may utilize the transition within the control bit portion of the frame to phase align the recovered clock with the data. The receiver performs serial to parallel conversion of the frame to produce the 20 bit wide word. The 4 bit control field is decoded to generate status indicating whether a data, control, or fill frame is received (described later). The receiver may also generate a parallel clock (STRBOUT) for clocking the data to external logic.

Frame Structure

In one embodiment of the invention, each data frame contains 24 bits. Twenty of the bits contain information. The other four bits determine whether a data frame, a control frame, or fill frame is present.

Data Frame

A data frame, for example, is used to send normal "ESCON" data. Each frame contains data that is 20 bits wide, and includes four control bits to indicate that the frame is a data frame. Table 1 illustrates an example of the contents of a data frame. The D-Field contains the 20 bit data word and the C-Field contains the 4 bit control field. The Data Status column defines the data when it is unaltered (True) or complemented (Inverted) and depends on the value of the cumulative sign of past and present data. The '*' after the data bits in the D-Field indicates that the bits have been inverted. In the exemplary embodiment, the D-Field is transmitted first ($D_0$ first) and the C-Field is transmitted last.

TABLE 1

Data Frame Structure

| Data Status | Flag Bit | D-Field | C-Field |
| --- | --- | --- | --- |
| True | 0 | $D_0$–$D_{19}$ | 1101 |
| Inverted | 0 | $D_0$*–$D_{19}$* | 0010 |
| True | 1 | $D_0$–$D_{19}$ | 1011 |
| Inverted | 1 | $D_0$*–$D_{19}$* | 0100 |

Data characters are used, for example, to transfer information between "ESCON" hosts and peripherals and may be data placed on link 18 (FIG. 3). Each character contains 10 bits. The most significant bit is an odd parity bit and forces a data character to contain an odd number of 1s. The next most significant bit indicates whether the character is an "ESCON" data character or a control character. For data characters, the bit is a '0'. The next 8 bits contain information passed between the host and peripherals and may be any one of 256 combinations ($2^8$).

Control characters are used, for example, to send control information between the "ESCON" hosts and peripherals any may be data placed on link 18 (FIG. 3). These characters delineate the start and end of a frame and initiate connection recovery and offline procedures. Other functions for these control characters are outlined in "ESCON I/O Interface," IBM, SA 22-7202-02 (June 1992) and is incorporated herein by reference.

Like a data character, a control character consists of 10 bits. The most significant bit is used to force odd parity. The ninth bit determines whether the character is data or control.

For a control character, this bit is a '1'. The next eight bits represent the "ESCON" control characters whose format results from a chip residing in a QPA module. The chip also creates characters for certain conditions occurring on the link, such as errors and frame delimiters. These characters may be transmitted from a QPA module through the switch matrix and to a DMIF module (see FIG. 4, for example). The DMIF module passes these characters without alteration.

"ESCON" architecture defines only a few control characters. Since 8 bits are available for defining a control character, as many as 256 ($2^8$) possible control characters may be defined and added by the DMIF module for transmission over the link to another DMIF module. For example, Table 2 defines various control characters that may be transmitted over a link between two DMIF modules. Some of the control characters are defined by ESCON architecture and generated by a QPA module and other control characters are generated by a DMIF module. The manner of generating control characters in the DMIF module will be described later.

TABLE 2

Control Character Definitions

| Control Character Name | Hex Value |
|---|---|
| K28.0 | 00 |
| K28.1 | 01 |
| K28.2 | 02 |
| K28.3 | 03 |
| K28.4 | 04 |
| K28.5 | 05 |
| K28.6 | 06 |
| K28.7 | 07 |
| CSOF | 27 |
| PSOF | 47 |
| CVERR | E0 |
| −K28.5 | E1 |
| +K28.5 | E2 |
| Disparity Error | E4 |
| Loss of Signal | EF |

Table 3 defines the control characters shown in Table 2.

TABLE 3

Detailed Control Character Definitions

| CONTROL CHARACTER | DEFINITION |
|---|---|
| K28.1 through K28.7 | These characters are combined into groups of two or three characters. As a group, they represent one function such as an "ESCON" frame delimiter or sequence. For example, a consecutive sequence of K28.6, K28.1 and K28.1 indicates that a disconnected end of frame delimiter is being received. |
| Connect Start of Frame | This character is a unique control character code generated by the QPA module when a K28.1 followed by a K28.7 are detected, indicating that a frame beginning with a connect start of frame delimiter is being received. The QPA module replaces the K28.7 with a character encoded as '27'. This character is passed unaltered through the switching matrix as well as the DMIF module. A DMIF module on the other side of the link decodes this character as a connect start of frame delimiter. |
| Passive Start of Frame | This character is a unique control character code generated by the QPA module when a K28.5 followed by a K28.7 are detected, indicating that a frame beginning with a passive start of frame delimiter is being received. The QPA module replaces the K28.7 with a character encoded as '47'. This character is passed unaltered through the switching matrix as well as the DMIF module. A DMIF module on the other side of the link encodes this character as a passive start of frame delimiter. |
| Disparity Errors | These are unique characters that the QPA module generates when the disparity for the received character is incorrect. When an 'E4' is detected, the QPA module has detected bad disparity on a data character or a control character other than a K28.5. If an 'E1' or 'E2' is detected, then the QPA module has detected incorrect disparity on a K28.5 character. The 'E1' indicates that a K28.5 with negative disparity is detected when one with positive disparity was expected. The 'E2' indicates that a K28.5 with positive disparity is detected when one with negative disparity was expected. These characters are passed unaltered through the switch and DMIF module. A DMIF module on the other side of the link detects these characters as error bytes. |
| Code Violation Error | This is a unique character ('E0') that the QPA module generates when it receives a data character that it cannot decode. This character is passed unaltered through the switch and DMIF module. A DMIF module on the other side of the link detects this character as an error byte. |
| Loss of Signal | This is a unique character generated by the DMIF module when any one of the four ESCON ports connected to the DMIF module are not receiving light. However, the link is active and the FOSA on the DMIF module is transmitting light. For this case, the DMIF module sends an 'EF' character that a DMIF module on the other side of the link may decode as a Loss of Signal condition and signal this condition to its connected ESCON ports. |

In-Band Messages

In-band message handling capability allows the DMIF to transfer control commands and status to other DMIFs. This information is transferred over the same communication path as the ESCON data so that an extra path between these devices is not needed. The communication is transparent to other ESCON devices attached to a DMIF.

In one embodiment, the data interface between two DMIFs carries four ESCON paths of data that are time division multiplexed onto one high-speed link. In-band messages are passed over this link as well. The particular time slot (port) it occupies as well as the particular bit within the ESCON byte defines each message. This technique has the advantage of allowing the DMIF to pass status to the other DMIF within a particular port's slot when it is not busy, even if the other ports are too busy to allow the transmission of status in their port's slots. There are two types of in-band messages that may be transferred: commands and status.

The definition of a message being transmitted depends on the 5 most significant bits of the ESCON 9 bit word, the particular time slot that it is sent, and the specific bits within the least significant 4 bits that are set. A command message is defined as a word that takes the form of 1FX or 1DX, where X represents the least significant 4 bits. A status message is defined as a word that takes the form of 18X or 19X. Since there are four time slots and each time slot has a different meaning, a specific 9-bit pattern within one slot has a different meaning than an identical pattern within a different time slot. For example, a command message of 1F4 received within port 0's time slot has a different meaning than a command message of 1F4 received within port 1's time slot. Exemplary command and status messages are defined in Tables 4 and 5.

Protocol requires that messages be transferred within two consecutive time slots. For example, a message defined for port 0 may be sent in two consecutive time slots pertaining to port 0. The message may only be sent when specific ESCON patterns are contained within the time slot. These patterns are Loss of Signal characters, sequences, or idles. The message replaces these patterns on the multiplexed link. If these patterns do not exist at the time that the message is to be transmitted, the sender may hold the message until the time slot for the message contains one of these patterns. At this point, the message may be sent.

Messages may also be received in-band with the ESCON data. The type of message, whether it is a command or status message, is determined by the most significant 5 bits of the 9 bit word. For a command word, these 5 bits are '1F' or '1D' and for a status word, these 5 bits are '18' or '19'. The message has to be received in two consecutive time slots for the port from which the message was sent. If only one time slot contains the message, it is discarded. The message words are also replaced by the data content that surrounds them before being transferred to the 200 Mbitsls links. For example, if a message is sent within a not operational sequence, the message words are replaced by the ordered pair that make up the sequence such that the ESCON device attached to the DMIF sees an uninterrupted not operational sequence. If this were not done, the ESCON devices would detect the messages as code violation errors that might force an erroneous loss of synchronization condition. Additionally, for the example just given, the ESCON device would detect that the sequence ended and began again, resulting in an additional link incidence report.

A command message, for example, may be sent from one DMIF to another DMIF. The other DMIF then may respond with a status message on the same port's time slot from which the command message is received. If a response is not received within 1 second, the message is retried once.

As described in one embodiment of the invention, messages are defined according to the port's time slot in which it exists, the value of the 5 most significant bits in the 9 bit word, and the particular bit with the least significant 4 bits that is asserted. Command messages contain a value of '1F' or '1D' in the 5 most significant bits and status messages contain a value of '18' or '19'. Table 4 defines the command and status messages of one embodiment. Each definition includes the port's time slot in which the message exists and the particular bit within the least significant 4 bits that is defined for the message.

Tables 4A and 4B define the '1F' command messages. In general, one bit is set for each message that forces a condition within a peripheral unit attached to a DMIF. Such peripheral unit may be, for example, a DMIF downstream unit (DDU). If future commands are received with this bit set, the condition is preserved. If a future command contains the bit negated, the condition is disabled. For example, a loop-back on port 0 exists as long as commands are received on port 0 that contain bit 2 asserted. If a command is received on this port with the bit negated, the loop-back is disabled. There may be cases where multiple bits are asserted within a command message in order to preserve conditions from previous commands. For example, if port 0 is in loop-back mode from a previous command and a Send Status command is to be sent while preserving the loop-back, the message would contain the value '1F5' (Send Status and Loop-back Port 0 bits asserted).

TABLE 4A

In-Band '1Fx' Command Messages

| Command Prefix | (x) Definition | | | |
|---|---|---|---|---|
| | 3 | 2 | 1 | 0 |
| 1Fx - Port 0 | Undefined Command #3 | Undefined Command #2 | Undefined Command #1 | Send Status |
| 1Fx - Port 1 | Undefined Command #6 | Undefined Command #5 | Undefined Command #4 | Restart DDU |
| 1Fx - Port 2 | Undefined Command #10 | Undefined Command #9 | Undefined Command #8 | Undefined Command #7 |
| 1Fx - Port 3 | Undefined Command #12 | Undefined Command #11 | Request FPGA Rev | Request Board Rev |

It will be understood that in DMIF to DMIF communications, only the Request Rev command is used. The other commands shown in Table 4A are used in DMIF to DDU communications.

TABLE 4B

Detail of In-Band '1Fx' Command Messages

| COMMAND | DEFINITION |
|---|---|
| Send Status (Port 0, Bit 0) | When this command is received, a peripheral, like a DDU for example, responds with its status. The DDU sends status information on all four ESCON ports. This command is normally sent when the DDU and DMIF have achieved synchronization. With no ESCON traffic occurring, the response to this command should occur quickly. This command, however, can be sent while the DDU is online with attached ESCON devices and passing traffic. The status may not be returned immediately in this latter case depending on the amount of traffic on each port. |
| Undefined Command #1 (Port 0, Bit 1) | The corresponding bit in the status word for this port is already defined. Therefore, this bit cannot be used for a future command if the corresponding status bit needs to be returned as a response. However, if a command is to be defined that does not require a response or can receive a response on a different port, then this bit may be used. |
| Undefined Command #2 (Port 0, Bit 2) | The corresponding bit in the status word for this port is already defined. Therefore, this bit cannot be used for a future command if the corresponding status bit needs to be returned as a response. However, if a command is to be defined that does not require a response or can receive a response on a different port, then this bit may be used. |
| Undefined Command #3 (Port 0, Bit 3) | The corresponding bit in the status word for this port is already defined. Therefore, this bit cannot be used for a future command if the corresponding status bit needs to be returned as a response. However, if a command is to be defined that does not require a response or can receive a response on a different port, then this bit may be used. |
| Restart DDU (Port 1, Bit 0) | This command initiates the DDU to perform a hardware reset, causing it to initialize itself. This causes the DDU to execute a power-on diagnostic test. There is not a direct response to this command from the DDU. The DMIF recognizes that the command is executed by recognizing loss of synchronization. When synchronization is reacquired, the DMIF executes normal startup sequence that includes issuing of the Send Status command. The result of the power-on diagnostics is reflected in the status returned for the Send Status command. |
| Undefined Command #4 (Port 1, Bit 1) | The corresponding bit in the status word for this port is already defined. Therefore, this bit cannot be used for a future command if the corresponding status bit needs to be returned as a response. However, if a command is to be defined that does not require a response or can receive a response on a different port, then this bit may be used. |
| Undefined Command #5 (Port 1, Bit 2) | The corresponding bit in the status word for this port is already defined. Therefore, this bit cannot be used for a future command if the corresponding status bit needs to be returned as a response. However, if a command is to be defined that does not require a response or can receive a response on a different port, then this bit may be used. |
| Undefined Command #6 (Port 1, Bit 3) | The corresponding bit in the status word for this port is already defined. Therefore, this bit cannot be used for a future command if the corresponding status bit needs to be returned as a response. However, if a command is to be defined that does not require a response or can receive a response on a different port, then this bit may be used. |
| Undefined Command #7 (Port 2, Bit 0) | The corresponding bit for the status word for this port is already defined. Therefore, this bit cannot be used for a future command if the corresponding status bit needs to be returned as a response. However, if a command is to be defined that does not require a response or can receive a response on a different port, then this bit may also be used. |
| Undefined Command #8 (Port 2, Bit 1) | The corresponding bit for the status word for this port is not defined. Therefore, this bit may be used for a future command that requires the assertion of the corresponding status bit as a response. However, if a command is to be defined that does not require a response or can receive a response on a different port, then this bit may also be used. |
| Undefined Command #9 (Port 2, Bit 2) | The corresponding bit for the status word for this port is already defined. Therefore, this bit cannot be used for a future command if the corresponding status bit needs to be returned as a response. However, if a command is to be defined that does not require a response or can receive a response on a different port, then this bit may be used. |
| Undefined Command #10 (Port 2, Bit 3) | The corresponding bit for the status word for this port is already defined. Therefore, this bit cannot be used for a future command if the corresponding status bit needs to be returned as a response. However, if a command is to be defined that does not require a response or can receive a response on a different port, then this bit may be used. |
| Request Board Rev (Port 3, Bit 0) | This command requests the Revision for the DDU Board. It is sent prior to the DDU Enable Command. The DDU responds using the seven REV bits and the appropriate REV ID Bit in the status word. |

TABLE 4B-continued

Detail of In-Band '1Fx' Command Messages

| COMMAND | DEFINITION |
|---|---|
| Request FPGA Rev (Port 3, Bit 1) | This command requests the Revision for the DDU FPGA. It is to be sent prior to the DDU Enable Command. The DDU responds using the seven REV bits and the appropriate REV ID Bit in the status word. |
| Undefined Command #11 (Port 3, Bit 2) | The corresponding bit for the status word for this port is already defined. Therefore, this bit cannot be used for a future command if the corresponding status bit needs to be returned as a response. However, if a command is to be defined that does not require a response or can receive a response on a different port, then this bit may be used. |
| Undefined Command #12 (Port 3, Bit 3) | The corresponding bit for the status word for this port is already defined. Therefore, this bit cannot be used for a future command if the corresponding status bit needs to be returned as a response. However, if a command is to be defined that does not require a response or can receive a response on a different port, then this bit may be used. |

Tables 4C and 4D show the In-Band '1Dx' command messages. One bit is set for each message that forces a condition within a DDU. If future commands are received with this bit set, the condition is preserved. If a future command contains the bit negated, the condition is disabled. For example, a loop-back on port 0 exists as long as commands are received on port 0 that contain bit 2 asserted. If a command is received on this port with the bit negated, the loop-back is disabled. There may be cases where multiple bits are asserted within a command message in order to preserve conditions from previous commands. For example, if port 0 is in loop-back mode from a previous command and a Send Status command is to be sent while preserving the loop-back, the message contains the value '1F5' (Send Status and Loop-back Port 0 bits asserted).

TABLE 4C

In-Band '1Dx' Command Messages

| | (x) Definition | | | |
|---|---|---|---|---|
| Command Prefix | 3 | 2 | 1 | 0 |
| 1Dx - Port 0 | Enable DDU | Loop-back Port 0 | Expansion Command #3 | Expansion Command #2 |
| 1Dx - Port 1 | Loop-back GLINK | Loop-back Port 1 | Expansion Command #5 | Expansion Command #4 |
| 1Dx - Port 2 | Expansion Command #8 | Loop-back Port 2 | Expansion Command #7 | Expansion Command #6 |
| 1Dx - Port 3 | Expansion Command #11 | Loop-back Port 3 | Expansion Command #10 | Expansion Command #9 |

TABLE 4D

Detail of In-Band '1Dx' Command Messages

| COMMAND | DEFINITION |
|---|---|
| Expansion Command #2 (Port 0, Bit 0) | The corresponding bit for the status word for this port is not defined. Therefore, this bit is used for a future command that requires the assertion of the corresponding status bit as a response. |
| Expansion Command #3 (Port 0, Bit 1) | The corresponding bit for the status word for this port is not defined. Therefore, this bit is used for a future command that requires the assertion of the corresponding status bit as a response. |
| Loop-Back Port 0 (Port 0, Bit 2) | On reception of this command, the DDU enables the electrical loop-back for the HOTLINK chip set and responds with status indicating that this option is enabled. This loop-back exists until the DDU receives a command on this port with this bit negated, which is considered the Remove Port 0 Loop-back command. Additionally, the loop-back is disabled if the DDU receives a Restart or Disable DDU command, or the DDU is manually reset or power cycled. This command can be issued as part of a test that occurs during manufacturing or field service. It should not be issued until the ESCON device attached to Port 0 on the DDU is offline. |
| Enable DDU (Port 0, Bit 3) | This command enables the DDU to pass ESCON traffic. The DDU responds to this command with the corresponding bit in the status word asserted. The DDU then turns its 200 Mbit/s transmitters on which initiates the ESCON traffic. This bit is continually asserted if the DDU is to stay enabled even if commands are issued for other reasons on this port, i.e. if the ID is requested while the DDU is already enabled, this bit should |

TABLE 4D-continued

Detail of In-Band '1Dx' Command Messages

| COMMAND | DEFINITION |
| --- | --- |
| | be asserted as well. If this bit is negated, the DDU becomes disabled and turns off its 200 Mbit/s transmitters. Therefore, before the DDU can be disabled, the devices should be brought offline either manually or by the DMIF sending the offline sequence. |
| Expansion Command #4 (Port 1, Bit 0) | The corresponding bit for the status word for this port is not defined. Therefore, this bit is to be used for a future command that requires the assertion of the corresponding status bit as a response. |
| Expansion Command #5 (Port 1, Bit 1) | The corresponding bit for the status word for this port is not defined. Therefore, this bit is to be used for a future command that requires the assertion of the corresponding status bit as a response. |
| Loop-Back Port 1 (Port 1, Bit 2) | On reception of this command, the DDU enables the electrical loop-back for the HOTLINK chip set and responds with status indicating that this option is enabled. This loop-back exists until the DDU receives a command on this port with this big negated, which is considered the Remove Port 1 Loop-back command. Additionally, the loop-back is disabled if the DDU receives a Restart or Disable DDU command, or the DDU is manually reset or power cycled. This command can be issued as part of a test that occurs during a manufacturing or field service. It should not be issued until the ESCON device attached to Port 1 on the DDU is offline. |
| Loop-Back GLINK (Port 1, Bit 3) | On reception of this command, the DDU enables the loop-back for the GLINK chip set such that data received at the 960 Mbit/s multiplexed receive link is passed to the transmit multiplexed link. The DDU responds with status indicating that this option is enabled. This loop-back exists until the DDU receives a command on this port with this bit negated, which is considered the Remove GLINK Loop-back command. Additionally, the loop-back is disabled if the DDU receives a Restart or Disable DDU command, or the DDU is manually reset or power cycled. This command can be issued as part of a test that occurs during manufacturing or field service. It should not be issued until all of the ESCON devices attached to the DDU are offline.<br>Only data is looped back to the sender. While this condition is active, command and status messages are processed as if the loop-back is not present, i.e. any received command messages are processed and the responses returned. |
| Expansion Command #6 (Port 2, Bit 0) | The corresponding bit for the status word for this port is not defined. Therefore, this bit is to be used for a future command that requires the assertion of the corresponding status bit as a response. |
| Expansion Command #7 (Port 2, Bit 1) | The corresponding bit for the status word for this port is not defined. Therefore, this bit is to be used for a future command that requires the assertion of the corresponding status bit as a response. |
| Loop-Back Port 2 (Port 2, Bit 2) | On reception of this command, the DDU enables the electrical loop-back for the HOTLINK chip set and responds with status indicating that this option is enabled. This loop-back exists until the DDU receives a command on this port with this bit negated, which is considered the Remove Port 2 Loop-back command. Additionally, the loop-back is disabled if the DDU receives a Restart or Disable DDU command, or the DDU is manually reset or power cycled. This command can be issued as part of a test that occurs during manufacturing or field service. It should not be issued until the ESCON device attached to Port 2 on the DDU is offline. |
| Expansion Command #8 (Port 2, Bit 3) | The corresponding bit for the status word for this port is not defined. Therefore, this bit is to be used for a future command that requires the assertion of the corresponding status bit as a response. |
| Expansion Command #9 (Port 3, Bit 0) | The corresponding bit for the status word for this port is not defined. Therefore, this bit is to be used for a future command that requires the assertion of the corresponding status bit as a response. |
| Expansion Command #10 (Port 3, Bit 1) | The corresponding bit for the status word for this port is not defined. Therefore, this bit is to be used for a future command that requires the assertion of the corresponding status bit as a response. |
| Loop-Back Port 3 (Port 3, Bit 2) | On reception of this command, the DDU enables the electrical loop-back for the HOTLink chip set and responds with status indicating that this option is enabled. This loop-back exists until the DDU receives a command on this port with this bit negated, which is considered the Remove Port 3 Loop-back command. Additionally, the loop-back is disabled if the DDU receives a Restart or Disable DDU command, or the DDU is manually reset or power cycled. This command can be issued as part of a test that occurs during manufacturing or field service. It should not be issued until the ESCON device attached to Port 3 on the DDU is offline. |
| Expansion Command #11 (Port 3, Bit 3) | The corresponding bit for the status word for this port is not defined. Therefore, this bit is to be used for a future command that requires the assertion of the corresponding status bit as a response. |

Tables 5A and 5B define the '18x' status messages. These status messages may be sent in response to a command or as unsolicited alarms. In either case, the status messages are not a command/response message pair. Individual or multiple bits may be asserted in the status messages depending on the conditions that are present within the DDU.

TABLE 5A

In-Band '18x' Status Messages

| | (x) Definition | | | |
|---|---|---|---|---|
| Status Prefix | 3 | 2 | 1 | 0 |
| 18x - Port 0 | Fan #1 Alarm | Diagnostics Failed | Diagnostics Passed | Power Supply #1 Alarm |
| 18x - Port 1 | REV ID Bit | REV Bit 6 | REV Bit 5 | REV Bit 4 |
| 18x - Port 2 | Fan #2 Alarm | Over Temperature Alarm | Undefined Response #1 | Power Supply #2 Alarm |
| 18x - Port 3 | REV Bit 3 | REV Bit 2 | REV Bit 1 | REV Bit 0 |

It will be understood that in DMIF to DMIF communications, only the REV ID Response status is used (in response to a Request Rev Command). The other responses shown in Table 5A are used in DMIF to DDU communications.

TABLE 5B

Detail of In-Band '18x' Status Messages

| COMMAND | DEFINITION |
|---|---|
| Power Supply #1 Alarm (Port 0, Bit 0) | This bit, when asserted, indicates that there is a fault within power supply #1. As long as this condition exists, this bit remains asserted for additional commands on this port. When this alarm is generated, the status word may be transmitted on the 960 Mbit/s link without being solicited, i.e. without receiving a Send Status command. Otherwise, the status of this alarm is sent in response to a Send Status command. The default condition for this bit is a '0'. |
| Diagnostics Passed (Port 0, Bit 1) | This bit, when asserted, indicates that the power on or externally initiated diagnostics have passed. It is initially reset when the DDU powers up or is manually reset and before the initial diagnostics are executed. It is also reset when the DDU receives the Restart DDU. If the diagnostics finish with no errors, this bit is asserted whenever status is returned on this port. Otherwise, this bit is negated. Once asserted, this bit stays asserted for additional commands on this port until one of the reset conditions mentioned previously is present. The default condition for this bit is a '0'. |
| Diagnostics Failed (Port 0, Bit 2) | This bit, when asserted, indicates that the power on or externally initiated diagnostics have failed. It is reset when the DDU powers up or is manually reset and before the initial diagnostics are executed. It is also reset when the DDU receives the Restart DDU. If the diagnostics finish with errors, this bit is asserted whenever status is returned on this port. Otherwise, this bit is negated. Once asserted, this bit stays asserted for additional commands on this port until one of the reset conditions mentioned previously is present. The default condition for this bit is a '0'. |
| Fan #1 Alarm (Port 0, Bit 3) | This bit, when asserted, indicates that there is a fault within fan #1. As long as this condition exists, this bit remains asserted for additional commands on this port. When this alarm is generated, this status word can be transmitted out the 960 Mbit/s link without being solicited, i.e. without receiving a Send Status command. Otherwise, the status of this alarm is sent in response to a Send Status command. The default condition for this bit is a '0'. |
| REV Bit 4 (Port 1, Bit 0) | This bit represents bit 4 for the revision status word. There are seven bits available for the status word. A value of all zeroes in this status word indicates the presence of a DMIF on the other end. A non-zero value indicates the presence of a DDU on the other end. The status word can represent the DDU Board revision or the DDU FPGA Revision level. The REV ID Bit is used to identify which of the two words is contained in the field. |
| REV Bit 5 (Port 1, Bit 1) | This bit represents bit 5 for the revision status word. There are seven bits available for the status word. A value of all zeroes in this status word indicates the presence of a DMIF on the other end. A non-zero value indicates the presence of a DDU on the other end. The status word can represent the DDU Board revision or the DDU FPGA Revision level. The REV ID Bit is used to identify which of the two words is contained in the field. |

TABLE 5B-continued

Detail of In-Band '18x' Status Messages

| COMMAND | DEFINITION |
| --- | --- |
| REV Bit 6<br>(Port 1, Bit 2) | This bit represents bit 6 for the revision status word. There are seven bits available for the status word. A value of all zeroes in this status word indicates the presence of a DMIF on the other end. A non-zero value indicates the presence of a DDU on the other end. The status word can represent the DDU Board revision or the DDU FPGA Revision level. The REV ID Bit is used to identify which of the two words is contained in the field. |
| REV ID Bit<br>(Port 1, Bit 3) | This bit is used to identify which of two revision status words is being sent. A '0' in this bit identifies the REV bits as a DMIF or DDU board Revision Status word. A '1' is this bit identifies the REV bits as a DDU FPGA Revision Status word. |
| Power Supply #2 Alarm<br>(Port 2, Bit 0) | This bit, when asserted, indicates that there is a fault within power supply #2. As long as this condition exists, this bit remains asserted for additional commands on this port. When this alarm is generated, this status word can be transmitted on the 960 Mbit/s link without being solicited, i.e. without receiving a Send Status command. Otherwise, the status of this alarm is sent in response to a Send Status command. The default condition for this bit is a '0'. |
| Undefined Response #1<br>(Port 2, Bit 1) | This bit is reserved as the status bit for an undefined status message. The default condition for this bit is a '0'. |
| Over-Temperature Alarm<br>(Port 2, Bit 2) | This bit indicates that the DDU has detected an over-temperature condition. As long as this condition exists, this bit remains asserted for additional commands received on this port. When this alarm is generated, this status word can be transmitted on the 960 Mbit/s link without being solicited, i.e. without receiving a Send Status command. Otherwise, the status of this alarm is sent in response to a Send Status command. The default condition for this bit is a '0'. |
| Fan #2 Alarm<br>(Port 2, Bit 3) | This bit, when asserted, indicates that there is a fault within fan #1. As long as this condition exists, this bit remains asserted for additional commands received on this port. When this alarm is generated, this status word can be transmitted on the 960 Mbit/s link without being solicited, i.e. without receiving a Send Status command. Otherwise, the status of this alarm is sent in response to a Send Status command. The default condition for this bit is a '0'. |
| REV Bit 0<br>(Port 3, Bit 0) | This bit represents bit 0 for the revision status word. There are seven bits available for the status word. A value of all zeroes in this status word indicates the presence of a DMIF on the other end. A non-zero value indicates the presence of a DDU on the other end. The status word can represent the DDU Board revision or the DDU FPGA Revision level. The REV ID Bit is used to identify which of the two words is contained in the field. |
| REV Bit 1<br>(Port 3, Bit 1) | This bit represents bit 1 for the revision status word. There are seven bits available for the status word. A value of all zeroes in this status word indicates the presence of a DMIF on the other end. A non-zero value indicates the presence of a DDU on the other end. The status word can represent the DDU Board revision or the DDU FPGA Revision level. The REV ID Bit is used to identify which of the two words is contained in the field. |
| REV Bit 2<br>(Port 3, Bit 2) | This bit represents bit 2 for the revision status word. There are seven bits available for the status word. A value of all zeroes in this status word indicates the presence of a DMIF on the other end. A non-zero value indicates the presence of a DDU on the other end. The status word can represent the DDU Board revision or the DDU FPGA Revision level. The REV ID Bit is used to identify which of the two words is contained in the field. |
| REV Bit 3<br>(Port 3, Bit 3) | This bit represents bit 3 for the revision status word. There are seven bits available for the status word. A value of all zeroes in this status word indicates the presence of a DMIF on the other end. A non-zero value indicates the presence of a DDU on the other end. The status word can represent the DDU Board revision or the DDU FPGA Revision level. The REV ID Bit is used to identify which of the two words is contained in the field. |

Table 5C and 5D define the '19x' status messages. These status messages are returned to the DMIF on the same port's time slot in which the command was received. Individual or multiple bits may be asserted in the status messages depending on the conditions that are present within a DDU.

TABLE 5C

In-Band '19x' Status Messages

| | (x) Definition | | | |
| --- | --- | --- | --- | --- |
| Status Prefix | 3 | 2 | 1 | 0 |
| 19x - Port 0 | DDU Enabled | Port 0 Looped back | Expansion Response #2 | Expansion Response #1 |

TABLE 5C-continued

In-Band '19x' Status Messages

| | (x) Definition | | | |
|---|---|---|---|---|
| Status Prefix | 3 | 2 | 1 | 0 |
| 19x - Port 1 | GLINK Looped back | Port 1 Looped back | Expansion Response #4 | Expansion Response #3 |
| 19x - Port 2 | Expansion Response #7 | Port 2 Looped back | Expansion Response #6 | Expansion Response #5 |
| 19x - Port 3 | Expansion Response #10 | Port 3 Looped back | Expansion Response #9 | Expansion Response #8 |

TABLE 5D

Detail of In-Band '19x' Status Messages

| COMMAND | DEFINITION |
|---|---|
| Expansion Response #1 (Port 0, Bit 0) | This bit is reserved as the status bit for the corresponding expansion command bit for this port. The default condition for this bit is a '0'. |
| Expansion Response #2 (Port 0, Bit 1) | This bit is reserved as the status bit for the corresponding expansion command bit for this port. The default condition for this bit is a '0'. |
| Port 0 Looped Back (Port 0, Bit 2) | This bit, when asserted, indicates that this port is looped back at the HOTLINK chip set. Any data for this port that is received on the 960 Mbit/s port is looped through the HOTLINK chip set and transmitted back to the sender (normally DMIF) over the 960 Mbit/s port. This bit is continually asserted for additional commands on this port as long as the condition persists. It is normally sent in response to the Loop-back Port 0 command but can also be sent in response to the Send Status command. It is negated when the DDU is power cycled, manually reset, or when it receives a Restart DDU or Remove Port 0 Loop-back command. The default condition for this bit is a '0'. |
| DDU Enabled (Port 0, Bit 3) | This bit, when asserted, indicates that the DDU is enabled to pass ESCON traffic and that its 200 Mbit/s transmitters are turned on. It is sent as a response to the Enable DDU command. It remains asserted for additional responses on this port until the DDU is power cycled, is manually reset, receives a DDU Restart command or DDU Disable command. Once disserted, this bit can only be asserted by an Enable DDU command. |
| Expansion Response #3 (Port 1, Bit 0) | This bit is reserved as the status bit for the corresponding expansion command bit for this port. The default condition for this bit is a '0'. |
| Expansion Response #4 (Port 1, Bit 1) | This bit is reserved as the status bit for the corresponding expansion command bit for this port. The default condition for this bit is a '0'. |
| Port 1 Looped Back (Port 1, Bit 2) | This bit, when asserted, indicates that this port is looped back at the HOTLINK chip set. Any data for this port that is received on the 960 Mbit/s port is looped through the HOTLINK chip set and transmitted back to the sender (DMIF) over the 960 Mbit/s port. This bit is continually asserted for additional commands on this port as long as the condition persists. It is normally sent in response to the Loop-back Port 1 command but can also be sent in response to the Send Status command. It is negated when the DDU is power cycled, manually reset, or when it receives a Restart DDU or Remove Port 1 Loop-back command. The default condition for this bit is a '0'. |
| GLINK Looped Back (Port 1, Bit 3) | This bit, when asserted, indicates that the GLINK chip set is looped back with respect to the 960 Mbit/s link. Any data that is received on this link is looped back to the sender (normally DMIF). This bit is continually asserted for additional commands on this port as long as the condition persists. It is normally sent in response to the Loop-back GLINK command. It is negated when the DDU is power cycled, manually reset, or when it receives a Restart DDU or Remove GLINK Loop-back command. The default condition for this bit is a '0'. |
| Expansion Response #5 (Port 2, Bit 0) | This bit is reserved as the status bit for the corresponding expansion command bit for this port. The default condition for this bit is a '0'. |
| Expansion Response #6 (Port 2, Bit 1) | This bit is reserved as the status bit for the corresponding expansion command bit for this port. The default condition for this bit is a '0'. |
| Port 2 Looped Back (Port 2, Bit 2) | This bit, when asserted, indicates that this port is looped back at the HOTLINK chip set. Any data for this port that is received on the 960 Mbit/s port is looped through the HOTLINK chip set and transmitted back to the sender (DMIF) over the 960 Mbit/s port. This bit is continually asserted for additional commands received on this port as long as the condition persists. It is normally sent in response to the Loop-back Port 2 command but can also be sent in response to the Send Status command. It is negated when the DDU is power cycled, manually reset, or when it receives a Restart DDU or Remove Port 2 Loop-back command. The default condition for this bit is a '0'. |

TABLE 5D-continued

Detail of In-Band '19x' Status Messages

| COMMAND | DEFINITION |
| --- | --- |
| Expansion Response #7 (Port 2, Bit 3) | This bit is reserved as the status bit for the corresponding expansion command bit for this port. The default condition for this bit is a '0'. |
| Expansion Response #8 (Port 3, Bit 0) | This bit is reserved as the status bit for the corresponding expansion command bit for this port. The default condition for this bit is a '0'. |
| Expansion Response #9 (Port 3, Bit 1) | This bit is reserved as the status bit for the corresponding expansion command for this port. The default condition for this bit is a '0'. |
| Port 3 Looped Back (Port 3, Bit 2) | This bit, when asserted, indicates that this port is looped back at the HOTLINK chip set. Any data for this port that is received on the 960 Mbit/s port is looped through the HOTLINK chip set and transmitted back to the sender (DMIF) over the 960 Mbit/s port. This bit is continually asserted for additional commands on this port as long as the condition persists. It is normally sent in response to the Loop-back Port 3 command but can also be sent in response to the Send Status command. It is negated when the DDU is power cycled, manually reset, or when it receives a Restart DDU or Remove Port 3 Loop-back command. The default condition for this bit is a '0'. |
| Expansion Response #10 (Port 3, Bit 3) | This bit is reserved as the status bit for the corresponding expansion command bit for this port. The default condition for this bit is a '0'. |

Fill Frames

For "ESCON" links, sequences are used by devices at both ends of the link to advance to an activation state whereby both devices are synchronized. The DMIF modules at both ends execute a similar process whereby both transceivers (for example, ser/des transmitter in DMIF module 34 and ser/des receiver in DMIF module 36) become synchronized with each other. This process involves passing fill frames between DMIF modules. Two levels of synchronization may occur when a link is being initialized. The first level is the ser/des transmitter and ser/des receiver synchronizing by using fill frames. When this completes, data may be passed on the link. The second level is "ESCON" synchronization using "ESCON" protocol sequences. Although the link is already synchronized, this second level is needed to advance the "ESCON" Loss of Synchronization state machine to an Idle state (described later). The fill frame structure is shown in Table 6.

TABLE 6

Fill Frame Structure

| Fill Frame Type | D-Field | | | C-Field |
| --- | --- | --- | --- | --- |
| | D0–D8 | D9–D10 | D11–D19 | C0–C3 |
| 0 | 111111111 | 10 | 000000000 | 0011 |
| 1a | 111111111 | 11 | 000000000 | 0011 |
| 1b | 111111111 | 00 | 000000000 | 0011 |

Fill frame 0 and fill frame 1 are defined in greater detail in Table 7.

TABLE 7

Definition of Fill Frames

| FILL FRAME | DEFINITION |
| --- | --- |
| Fill Frame 0 (FF0) | This frame, after its been serialized, is a 50% duty cycle waveform. It is sent after the ser/des transmitter has been initialized. The ser/des receiver uses this frame to determine the frequency with which it should be operating. It does this by locking its recovered clock to the transition of the frame between bits D9 and D10. |
| Fill Frame 1 (FF1) | This frame toggles between two types of waveforms. It is similar to the FF0 frame except for the location of the transition from '1's to '0's. After its data has been serialized, it is a square wave whereby the first waveform advances the falling edge of FF0 by one bit and the second waveform retards the falling edge of FF0 by one bit. This frame is sent by the ser/des transmitter during link initialization prior to the link reaching the activation state. The ser/des receiver uses this frame to detect phase differences between the data and the recovered clock. In order to maintain synchronization, the ser/des receiver adjusts the recovered clock according to the phase differences. |

It will be appreciated that other messages with different formats may be transmitted over the link between two DMIF modules. These messages, for example, other control and status messages, may be transmitted over the link in-band or in-line with the "ESCON" messages. In-band or in-line message handling by the DMIF module allows information to be transferred over the same communications path or link such that an extra path between two channel directors is not necessary. Communication is transparent to the "ESCON" devices attached to a channel director at each end of a link.

Initialization procedure between two DMIF modules will now be described. Link initialization may occur whenever a ser/des receiver, for example, is reset. The reset may be executed when the DMIF module is powered on, the DMIF module's optical transceiver detects no light on the link, or if all of the "ESCON" ports detect a loss of synchronization due to parity errors or code violation errors. The reset initializes the state machine in the ser/des receiver, forcing it to state '0'. By sending specific signals (detailed below) between the ser/des receiver and ser/des transmitter, the advancement of the state machine to the active state is transparent to the rest of the "ESCON" system.

While in state 0, the ser/des transmitter transmits the FF0 frame. Once the ser/des receiver recognizes that it is receiving the FF0 frame, it advances the state machine to state 1 which enables the ser/des transmitter to transmit the FF1 frame. After the ser/des receiver detects the FF1 frame, it advances the state machine to state 2 and generates LINK READY. While in state 2, the ser/des transmitter transmits FF1 until ESCON data is ready to be sent.

Figure 7:
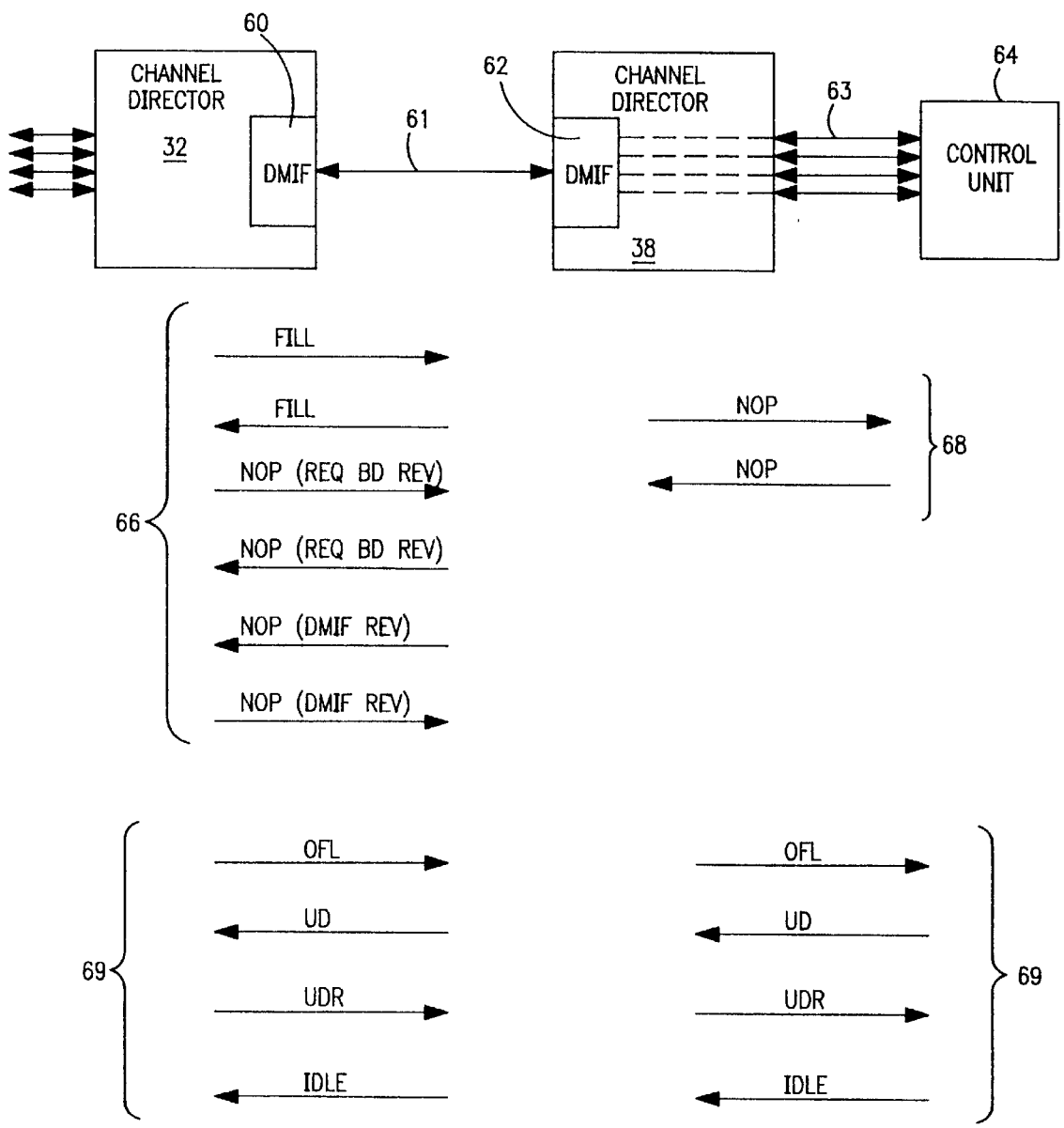
FIG. 7 illustrates an initialization sequence between two remote devices using DMIF modules and a control unit which does not have a DMIF module.

An example of an initialization sequence between remote devices containing DMIF modules is shown in FIG. 7. As shown, DMIF module 60 of channel director 32 is linked to DMIF module 62 over optical link 61. DMIF module 62 of channel director 38 also communicates through four dedicated links 63 with control unit 64. The initialization sequence between DMIF module 60 and DMIF module 62 is generally designated as 66. The initialization sequence is between DMIF module 62 and control unit 64 is generally designated as 68.

The sequences, as shown, progress from top to bottom in FIG. 7. DMIF module 60 initially transmits a fill frame (see Table 7) so that the ser/des transmitter may synchronize with the ser/des receiver in DMIF module 62. An NOP (not operational) is sent from DMIF module 62 to control unit 64 indicating that the DMIF is not operational. This is normal "ESCON" traffic and represents the flow on all four links 63. DMIF module 62 then sends a fill frame to DMIF module 60. As already described, the fill frames synchronize the two DMIF modules with each other.

As normal "ESCON" traffic is flowing with messages indicating the NOP sequence, the DMIF modules transmit in-band messages (previously described). These are shown in FIG. 7 with the in-band message identified in parenthesis. For example, NOP (REQ BOARD REV) indicates a Request BOARD REV command transmitted within the NOP sequence. Accordingly, once DMIF module 60 recognizes that link 61 is synchronized (after fill frame messages), DMIF module 60 issues a Request BOARD REV in-band command to determine the identity of the external device. DMIF module 62 also issues a Request BOARD REV in-band command. Each DMIF module then responds with a DMIF REV, indicating that each is connected to a DMIF module. At this point, no further action is necessary and both DMIF modules are now on-line. Normal "ESCON" data, designated generally as 69, may now be sent between remote devices by way of the DMIF modules. For example, FIG. 7 shows OFL (Offline Sequence), UD (Unconditional Disconnect Sequence), UDR (Unconditional Disconnect Response Sequence) and IDLE (Idle Sequence) sequentially transmitted between remote devices. It will be appreciated that commands and status messages sent between DMIF 60 and DMIF 62 are never seen by control unit 64, since they are replaced with NOP by the DMIF before passing them onto the control unit. In this manner, in-band messages are transparent to the control unit.

Figure 8:
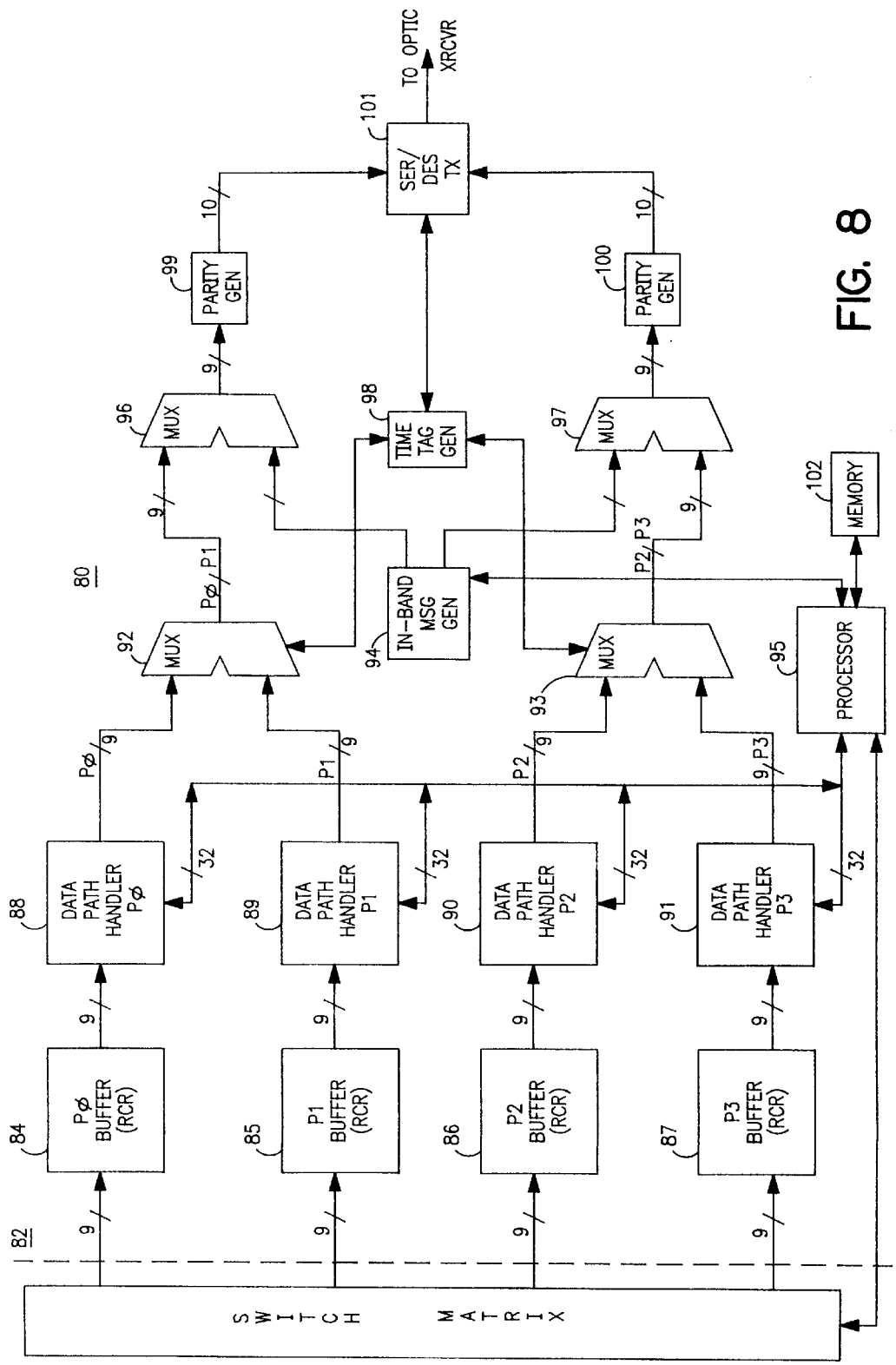
FIG. 8 is a block diagram of another embodiment of a multiplexer of the present invention further illustrating in-band message generation.
Figure 9:
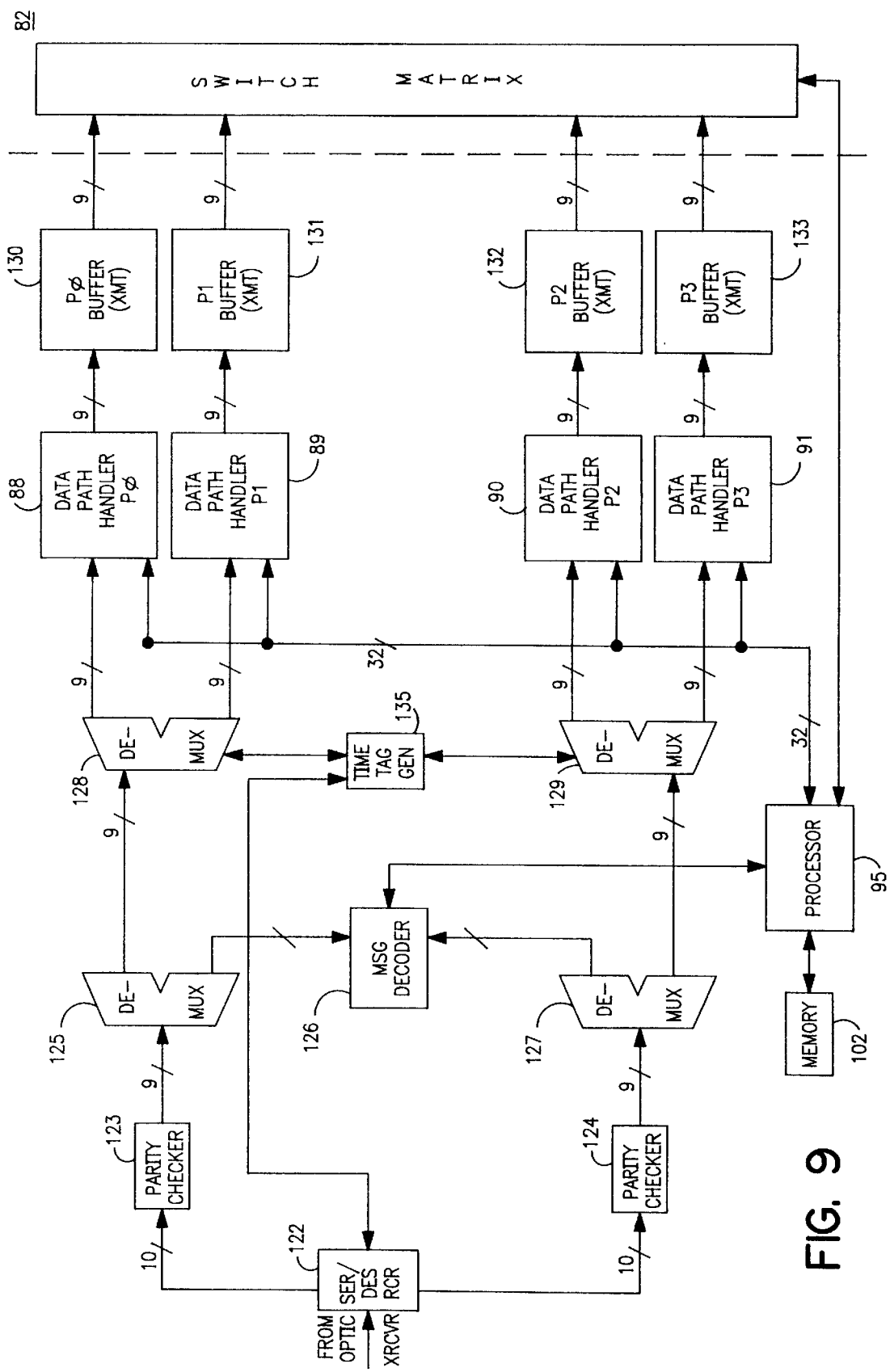
FIG. 9 is a block diagram of still another embodiment of a demultiplexer of the present invention further illustrating in-band message decoding.

Another exemplary embodiment of in-band messages added to "ESCON" data is shown in FIG. 8 and an embodiment in which in-band messages are removed from "ESCON" data is shown in FIG. 9. As shown in FIG. 8, multiplexer 80 receives data from four "ESCON" ports of switch matrix 82. Data from the four ports are stored in respective buffers 84–87. Data path handlers 88–91 detect the presence of data from a respective port. Each data path handler also provides control and status interface between itself and processor 95. The interface is a thirty-two bit, interrupt driven interface that allows processor 95 to emulate the "ESCON" protocol. The emulation includes establishing or breaking connection and monitoring status. The data path handlers are implemented in four XCS30-3 Xilinx Spartan FPGAs.

When a connection is made to pass data by a data path handler, the processor determines which port needs to be connected in the switch matrix. The program for processor 95 is loaded from memory 102 which is, for example, non-volatile memory. Processor 95 also provides the in-band message to in-band message generator 94, which in turn sends the in-band message to multiplexer 96 and multiplexer 97. As shown in FIG. 8, multiplexer 96 is coupled between multiplexer 92 and parity generator 99. Similarly, multiplexer 97 is coupled between multiplexer 93 and parity generator 100. The multiplexing of data from two ports each having a 200 megabit/sec rate into a serial data output from ser/des transmitter 101 having a 960 megabit/sec rate has already been described.

Figure 10:
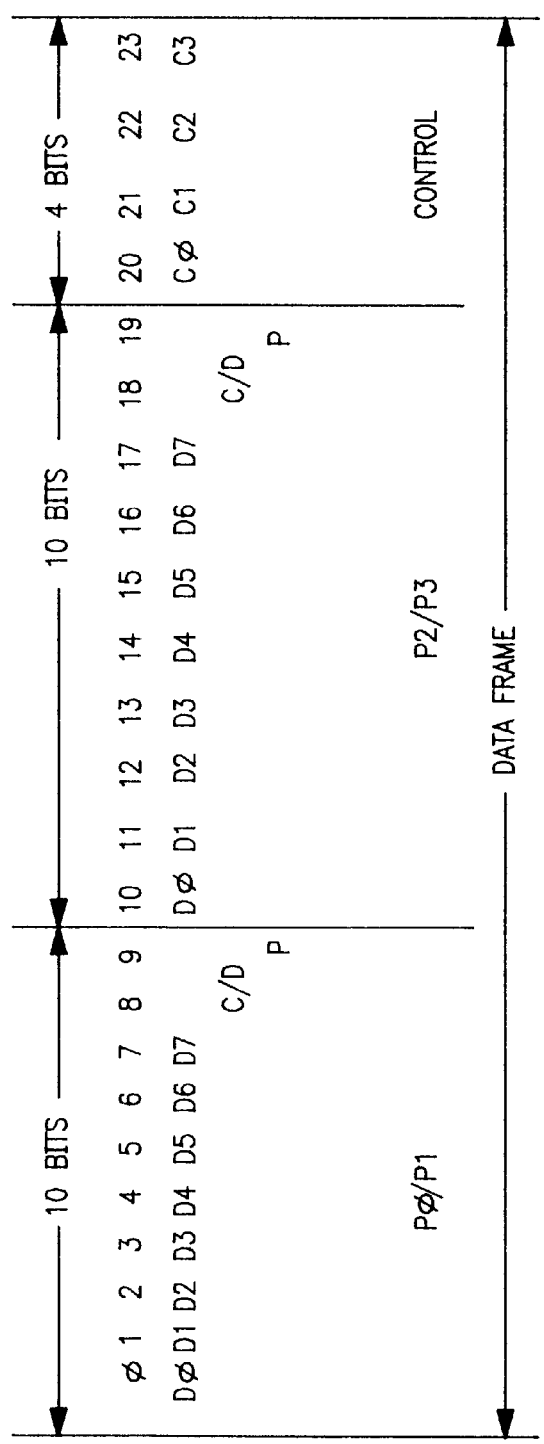
FIG. 10 illustrates a data frame being transmitted or received between two devices of the present invention.

It will be appreciated that the data begins as 9 bits wide at the input to each multiplexer 92 and multiplexer 93, 1 bit parity is added by parity generator 99 and parity generator 100 and 4 bits of control data are added by ser/des transmitter 101. Thus, a data frame consists of 24 bits of data. The data frame is illustrated in FIG. 10 as 9 bits of data (D0–D7 and a control/data (C/D) bit), a parity bit (P) and 4 bits for control (C0–C3). Since 4 to 1 multiplexing is performed and ser/des transmitter 101 serializes the data, an effective output rate of 960 megabits/sec is $$\text{produced}\left(4 \times \frac{20.0\,\text{Mbytes}}{\text{sec}} \times \frac{1\,\text{frame}}{2\,\text{bytes}} \times \frac{24\,\text{bits}}{1\,\text{frame}} = 960\,\text{Mbits/sec}\right).$$

Figure 11:
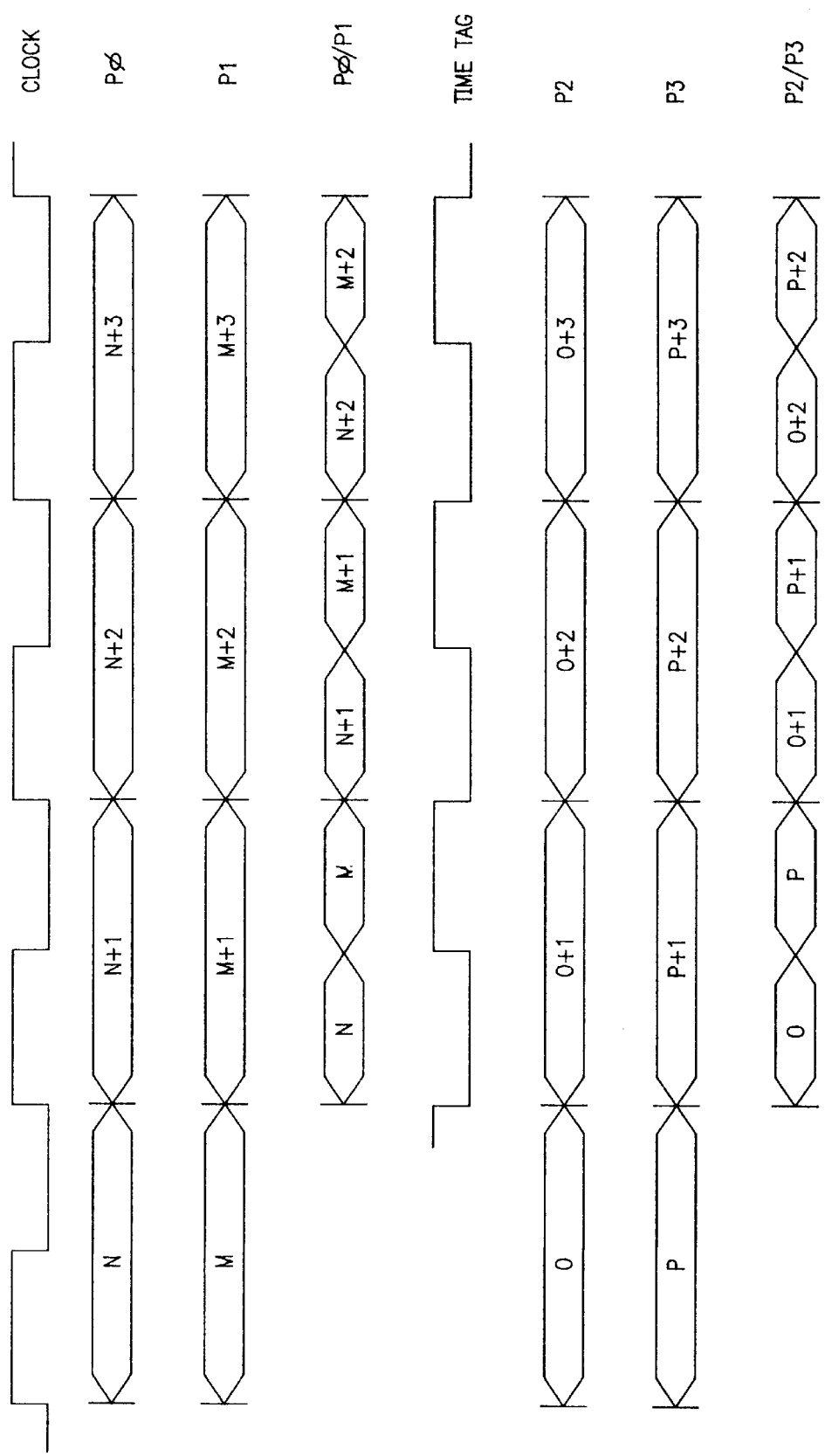
FIG. 11 is a timing diagram illustrating multiplexing of data from ports P0, P1, P2 and P3 of the DMIF module of the present invention.

FIG. 11 illustrates multiplexing of data, for example, from four ports, (P0, P1, P2 and P3) by multiplexer 92 and multiplexer 93 (FIG. 8) into P0/P1 and P2/P3 data. As described earlier, time tag generator 98 (FIG. 8) produces a time tag which is toggled to identify the ESCON port in the 10 bit stream. The time tag signal has two phases, a first phase ("0") and a second phase ("1"). When a "0" is transmitted to ser/des transmitter 101 (FIG. 8), for example, the data frame may contain data from ports P0 and P2; when a "1" is transmitted, for example, the data frame may contain data from ports P1 and P3. In this manner, data from four ports may be multiplexed in one time tag cycle.

FIG. 9 shows the inverse process illustrated in FIG. 8. As shown, demultiplexer 120 receives serialized data from an optical transceiver (not shown) and ser/des receiver 122. Receiver 122 converts the incoming message having a data rate of 960 megabits/sec into two separate 10 bit wide parallel lines, each coupled to parity checker 123 and 124, respectively. Parity checkers 123 and 124 each verify parity and provide a 9 bit wide word to demultiplexer 125 and 127, respectively. Processor 95 and message decoder 126 decode the in-band message for control and status information.

After synchronization and recovery of the serial clock by ser/des receiver 122, a time tag signal is provided to time tag generator 135, which in turn provides the time tag to demultiplexers 128 and 129. By maintaining proper phase with the time tag signal, demultiplexers 128 and 129 demultiplex the data into four "ESCON" data words, each 9 bits wide. Data path handlers 88–91 receive the four "ESCON" data words and provide the same to buffers 130–133. Data are then sent to "ESCON" ports P0, P1, P2 and P3 by way of switch matrix 82.

What is claimed:

1. A device for converting at least four parallel data streams on respective input data lines into one serial data stream on a fiber optic data line, the device comprising:

a first multiplexer for multiplexing at least two of the parallel data streams into a first intermediate output stream;

a second multiplexer for multiplexing at least two other of the parallel data streams into a second intermediate output stream;

a serializing transmitter coupled to the first and second multiplexers for serializing the first and second intermediate output streams into the serial data stream, and a signal for synchronizing the serializing of the first and second intermediate output streams and tagging output data in the serial data stream as corresponding with data from each of the respective input data lines wherein the signal includes a cycle having a first phase and a second phase, the first phase for tagging output data in the serial data stream from two of the respective input data lines and the second phase for tagging output data in the serial data stream from another two of the respective input data lines.

2. The device of claim 1 including an optical transmitter for transmitting the serial data stream onto the fiber optic data line.

3. The device of claim 1 wherein the data from each of the respective input data lines is 9 bits wide and an output frame in the serial data stream is 24 bits long.

4. The device of claim 3 wherein a parity generator is coupled between the first multiplexer and the serializing transmitter for adding a parity bit to one of the respective input data lines.

5. A device for converting a serial input data stream on a fiber optic data line to at least four parallel data streams on respective output data lines, the device comprising:

a receiver for de-serializing the input data stream into first and second intermediate parallel data streams, a first demultiplexer for demultiplexing the first intermediate parallel data stream into two parallel data streams on two respective output data lines;

a second demultiplexer for demultiplexing the second intermediate parallel data stream into two other parallel data streams on two other output data lines; and a signal for synchronizing the de-serializing of the first and second intermediate output streams and tagging data in the serial input data stream as corresponding to data in each of the respective output data lines wherein the signal includes a cycle having a first phase and a second phase, the first phase for tagging data from two of the respective output data lines to data in the serial input data stream and the second phase for tagging data from two of the other respective output data lines to data in the serial input data stream.

6. The device of claim 5 wherein the receiver includes an optical receiver for receiving the serial input data stream from the fiber optic data line.

7. The device of claim 5 wherein the data from each of the respective output data lines is 9 bits wide and an input frame in the serial input data stream is 24 bits long.

8. In channel-to-channel communications among devices, wherein each device has a plurality of ports for connecting to communication links between the devices, a method for communicating between two devices over a single link comprising the steps of:

(a) converting a plurality of data streams from respective ports of a first of the two devices into one serial data stream, including the steps of:

(i) multiplexing at least two of the plurality of data streams into a first intermediate output stream;

(ii) multiplexing at least two other of the plurality of data streams into a second intermediate output stream;

(iii) serializing the first and second intermediate output streams into the serial data stream, (iv) synchronizing the serialization of the first and second intermediate output streams, (v) tagging output data in the serial data stream as corresponding to data from each of the respective ports of the first device, including providing a signal having a cycle with a first phase and a second phase, and tagging two of the respective ports with the first phase and tagging two other respective ports with the second phase, and (vi) transmitting the serial data stream on the single link to a second of the two devices;

(b) converting the serial data stream in the second device to at least four input data streams, and (c) sending each of the input data streams to a port of the second device.

9. The method of claim 8 wherein step (b) includes the steps of:

(i) de-serializing the serial data stream into first and second intermediate parallel data streams, (ii) demultiplexing the first intermediate parallel data stream into two parallel data streams on two respective data lines;

(iii) demultiplexing the second intermediate parallel data stream into two other parallel data streams on two other respective data lines;

(iv) synchronizing the de-serialization of the first and second intermediate output streams and (v) separating data in the serial data stream to data for each of the respective data lines.

10. The method of claim 8 wherein the single link is a fiber optic link.

11. In channel-to-channel communications among devices, wherein each device has a plurality of ports for connecting to communication links between the devices, a method for communicating between two devices over a single link comprising the steps of:

(a) converting a plurality of data streams from respective ports of a first of the two devices into one serial data stream;

(b) transmitting the serial data stream on the single link to a second of the two devices;

(c) converting the serial data stream in the second device to at least four input data streams, (d) sending each of the input data streams to a port of the second device, (e) transferring the plurality of data streams between the first and second devices, and (f) checking status between the first and second devices free of disrupting the transfer of the plurality of data streams.

12. In an Enterprise Systems Connection (ESCON) architecture having channel directors, each channel director including (a) input and output data ports for receiving and transmitting data streams and (b) a switch matrix for dynamically connecting the data ports, wherein a first channel director communicates with a second channel director over a fiber optic data line, a device for the first channel director comprising:

at least four input ports, each port receiving one of the data streams, a multiplexer for converting the data streams from the four input ports into an intermediate data stream, a transmitter for serializing the intermediate data stream into a serial data stream for output onto the fiber optic data line, and a signal for tagging output data in the serial data stream as corresponding to data from each of the respective input ports wherein the signal includes a cycle having a first phase and a second phase, the first phase for tagging output data in the serial data stream from two ports of the respective input ports and the second phase for tagging output data in the serial data stream from two other ports of the respective input ports.

13. The ESCON architecture of claim 12 further including a second device for the second channel director, the second device comprising a receiver for receiving the serial data stream from the fiber optic data line, a demultiplexer for demultiplexing the serial data stream into four parallel data streams, and an identifier for identifying each of the four parallel data streams as belonging to one of the four ports from the first channel director.

* * * * *